United States Patent [19]

Sandor et al.

[11] 4,403,880

[45] * Sep. 13, 1983

[54] RECORD CLEANER/CONDITIONER

[75] Inventors: Joseph Sandor, Reseda; Claude P. Davis, Woodland Hills, both of Calif.

[73] Assignee: California Sounds Ltd., Chatsworth, Calif.

[*] Notice: The portion of the term of this patent subsequent to Sep. 4, 1996, has been disclaimed.

[21] Appl. No.: 243,624

[22] Filed: Mar. 13, 1981

Related U.S. Application Data

[63] Continuation of Ser. No. 64,503, Aug. 7, 1979, abandoned, which is a continuation-in-part of Ser. No. 863,897, Dec. 23, 1977, Pat. No. 4,166,626.

[51] Int. Cl.³ .............................................. G11B 3/58
[52] U.S. Cl. .................................. 401/134; 401/273; 401/206
[58] Field of Search ................. 369/72, 74; 401/134, 401/135

[56] References Cited

U.S. PATENT DOCUMENTS

| | | | |
|---|---|---|---|
| 2,579,167 | 12/1951 | Atkinson | 401/273 |
| 3,233,275 | 2/1966 | Hansen et al. | 401/206 |
| 3,349,966 | 10/1967 | Schwartzman | 401/134 |
| 3,355,177 | 11/1967 | King, Sr. | 369/72 |
| 3,484,171 | 12/1969 | Rosendall et al. | 401/206 |
| 3,486,757 | 12/1969 | Loescher | 369/72 |
| 3,594,850 | 7/1971 | Wellington | 15/DIG. 12 |
| 4,049,354 | 9/1977 | O'Rourke | 401/134 |
| 4,166,626 | 9/1979 | Sander et al. | 369/72 |
| 4,244,587 | 1/1981 | Schweizer | 15/DIG. 14 |
| 4,257,616 | 3/1981 | Pless | 15/DIG. 14 |

FOREIGN PATENT DOCUMENTS

| | | | |
|---|---|---|---|
| 46116 | 1/1911 | Austria | 401/273 |
| 2756688 | 6/1979 | Fed. Rep. of Germany | 369/72 |
| 2847931 | 5/1980 | Fed. Rep. of Germany | 369/72 |

*Primary Examiner*—William Pieprz
*Attorney, Agent, or Firm*—Spensley, Horn, Jubas & Lubitz

[57] ABSTRACT

A record cleaning/conditioning device for cleaning, conditioning and rendering the surface of a phonograph record substantially static-free is disclosed. The device comprises an elongated arm member having a cleaning surface disposed on one side thereof. The cleaning surface is adapted to engage and clean the surface of a record so as to remove dirt and other undesirable material therefrom. A reservoir is disposed on the arm member for supplying a cleaning/conditioning fluid to the cleaning surface. By use of the device of the present invention, phonograph records of varying sizes can be efficiently cleaned, conditioned and rendered substantially static-free.

14 Claims, 6 Drawing Figures

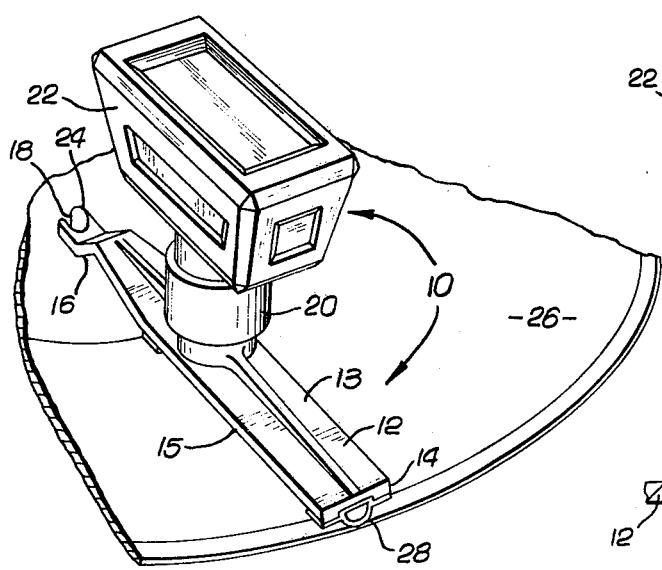
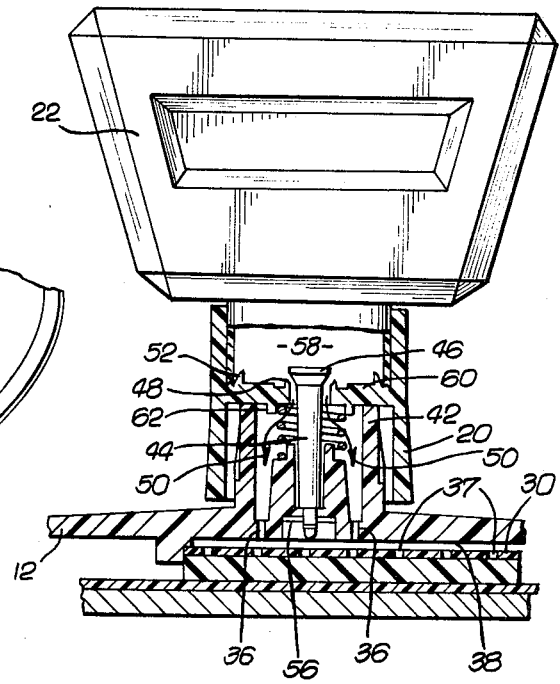
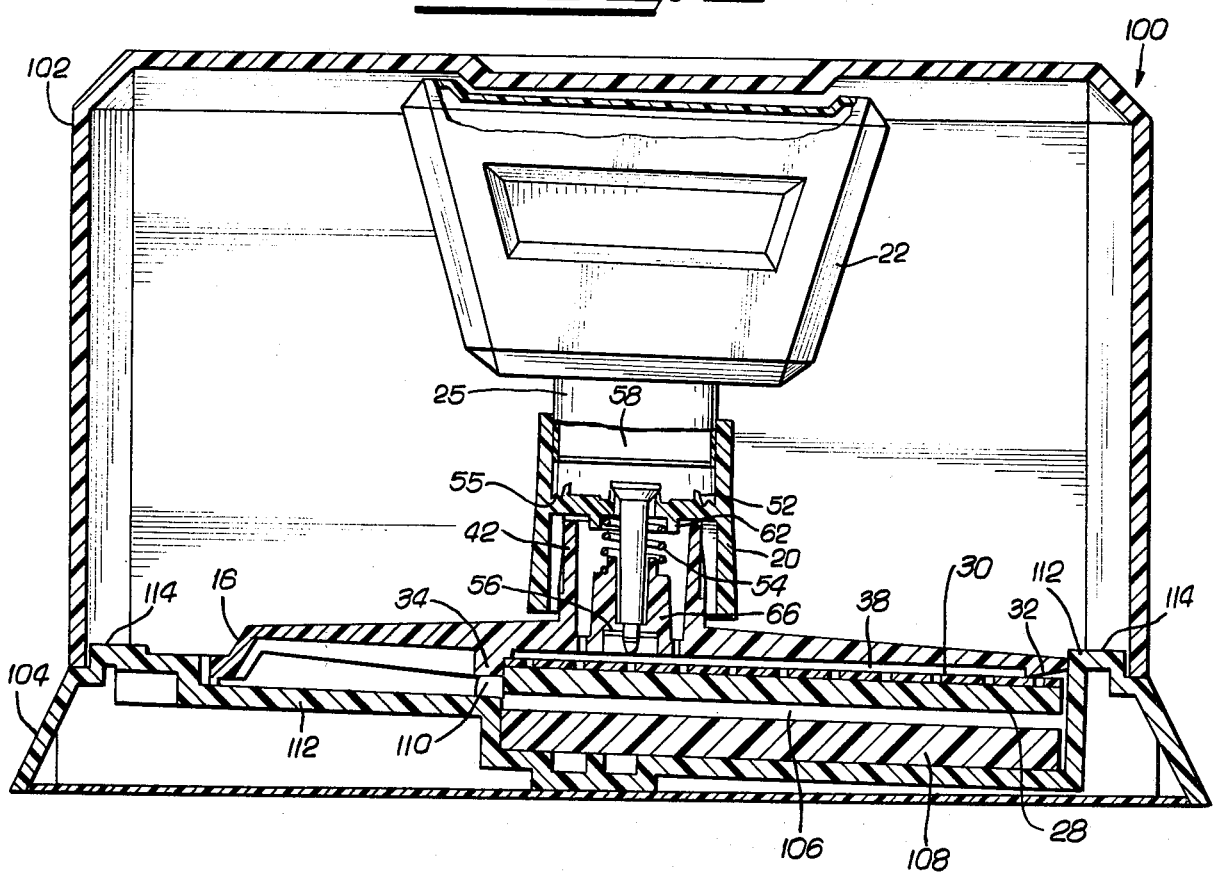

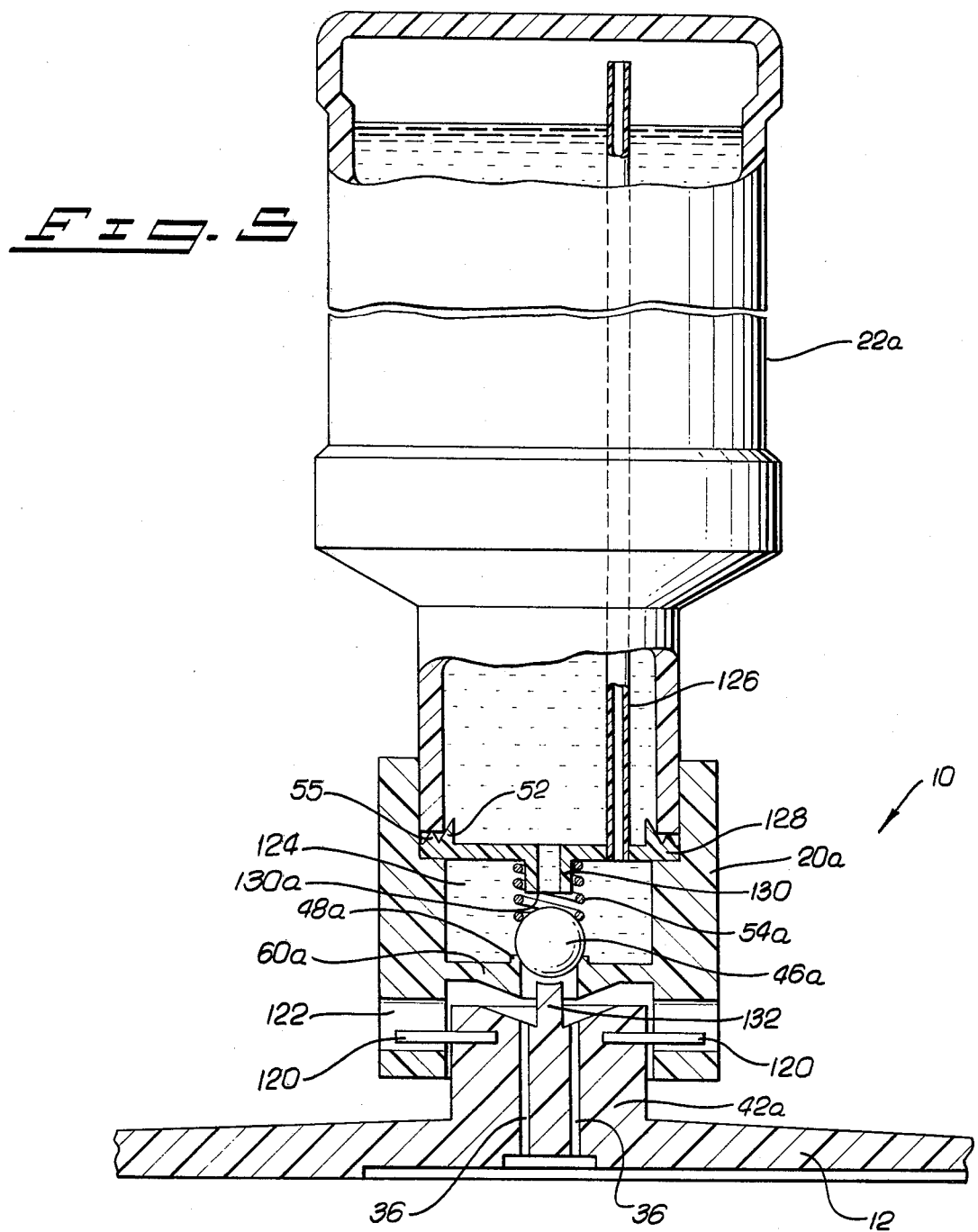

RECORD CLEANER/CONDITIONER

This application is a continuation of Application Ser. No. 64,503 filed Aug. 7, 1979, now abandoned, which is a continuation-in-part of Application Ser. No. 863,897 filed Dec. 23, 1977, now U.S. Pat. No. 4,166,626, issued Sept. 4, 1979.

BACKGROUND OF THE INVENTION

1. Field of the Invention

The present invention relates to the field of devices for use in connection with phonograph records, and more specifically, to a device for providing phonograph records with a cleaned, conditioned, lubricated and static-free playing surface.

2. Prior Art

The advancements made in today's high fidelity phonograph systems have brought sound reproduction to an extremely high level. However, because such systems are of such quality and accuracy, should the grooves of a typical record contain even minor amounts of dirt, either in the form of particles of dust, oils, fingerprints, smoke and/or other undesirable material, such contamination can be picked up by the phonograph stylus, magnified, and heard through the speakers. Further, modern records are very susceptible to static electricity which causes dust and dirt to adhere and to be attracted to the surface. Thus, there is a great need to keep the surface of such records extremely clean as well as static-free.

While the problems caused by contamination in the grooves of phonograph records has been recognized in the industry for some time, the means to efffectively remove contamination from the relatively fragile surface of a record has been elusive. Recently, there has been a proliferation of devices which have attempted to remove the undersirable contamination from the grooves of the record. In these devices, various cleaning brushes, pads, and other applicators, both with and without cleaning solutions, are used to clean the record. One such device is marketed under the name "Vac-o-Rec". This device removes dust from the phonograph record by applying a vacuum brush system to the surface.

Another record cleaning device is sold by the Discwasher Company. In the Discwasher device, a velvet pad is used with several drops of a cleaning fluid. The fluid is applied to the pad which is then swept back and forth around the record.

Yet another device is sold under the name "Lenco-Clean Systems" which contains an arm with a storage reservoir attached to the stylus arm and applied to the record via a small plastic brush. Yet other devices are made by Realistic, Soundguard, Watts, Memorex Keith Monks and others.

While all of the above devices do tend to clean the record somewhat, it has been found that they all contain a number of shortcomings. For example, many of the above-referenced devices are extremely awkward to use while others are extremely complex to mount onto the stylus arm or turntable, and can otherwise interfere with the travel of the record on the record player. Further, it has been determined that there are three basic problems to be considered in the care and handling of phonograph records, to wit: 1. removing contaminants from the record for better sound reproduction in which some of the above-identified devices more or less tend to perform satisfactorily; 2. conditioning the record such that less wear of the stylus on the record grooves is achieved. Conditioning of the record usually requires that a liquid composition be applied. While some of the above-identified devices condition the records, they do so at the expense of proper cleaning of the grooves; and 3. treating the record so as to render it substantially static-free thereby eliminating the build-up of dust which is attracted by static electricity to the surface thereof. Again, while some of the above devices do tend to render the surface of a record static-free, they do so at the expense of proper cleaning and/or conditioning.

Prior art references which show yet other cleaning devices are disclosed in U.S. Pat. Nos. 3,486,757; 3,355,177; and German Pat. No. 46,116.

In Application, Ser. No. 863,897, a record cleaning device which overcomes the problems associated with these prior art devices was disclosed. Such device not only cleaned the record, but also conditioned it, lubricated it, and rendered it substantially static-free. The present device represents yet further advancement in the record cleaning art. The device of the present invention is relatively simple to produce, easy to use, and contains none of the complexities associated with the prior art devices. The device of the present invention is preferably used with a highly volatile cleaning solution which prior art could not use. That is, in prior art devices if a highly volatile cleaning solution was used, by the time the cleaning fluid was applied to the record, a substantial portion of the cleaning fluid would evaporate and thus prevent proper cleaning and conditioning. Prior art devices therefore used low volatile solutions. But this meant that the record had to be dried before it could be used.

The device of the present invention enables even a highly volatile cleaning/conditioning solution to be applied in such a manner that the entire record is cleaned/conditioned before the solution volatilizes. After cleaning/conditioning is completed the solution is evaporated. This enables the record to be played immediately after cleaning/conditioning is completed.

BRIEF SUMMARY OF THE INVENTION

The present invention relates to phonograph record care cleaning/conditioning devices, and more specifically, to a phonograph cleaning/conditioning device which removes dirt, dust and other undesirable contaminants from the surface of a phonograph record and which also lubricates and conditions the surface of the record and renders it substantially static-free. The device of the present invention comprises an elongated arm member having a cleaning surface disposed on one side thereof. The surface is designed to engage and clean/condition the surface of a record so as to remove dirt and other undesirable material therefrom. The arm member is configured such that when the device is disposed on the record to be cleaned/conditioned, the arm radially extends from the midpoint of the record to the periphery thereof.

In one embodiment, the cleaning surface is in the form of a foam core having outwardly extending bristles attached to the core. In other embodiments, a wide range of different types of cleaning/conditioning surfaces can be used. A housing is rotatably coupled to the arm member such that the device can be selectively rotated about a record to be cleaned. A cleaning fluid reservoir is coupled to the housing and supplies the cleaning surface with the cleaning/conditioning fluid.

Finally, a valve member is disposed in the housing for regulating the flow of the fluid to the cleaning surface.

In using the device of the present invention, a highly volatile cleaning/conditioning fluid is placed in the fluid reservoir. The reservoir is joined to the housing. Depressing the housing towards the arm member causes the valve to selectively open thus permitting the cleaning/conditioning fluid to flow through the arm member to the cleaning/conditioning surface. When the housing is released, it returns to its original position causing the valve surface to stop the flow of fluid to the cleaning surface on the arm.

When not in use the device of the present invention, can be placed in a uniquely designed container. The container enables the device of the present invention to be securely mounted therein such that the device is retained in a predetermined position.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view showing the device of the present invention engaging a phonograph record;

FIG. 2 is a cutaway view of the device of the present invention disposed in an associated container;

FIG. 4 is a partial cutaway view of the device of the present invention when the valve housing has been depressed;

FIG. 6 is an enlarged cutaway view showing the valve member and associated valve housing.

DESCRIPTION OF THE INVENTION

Figure 3:
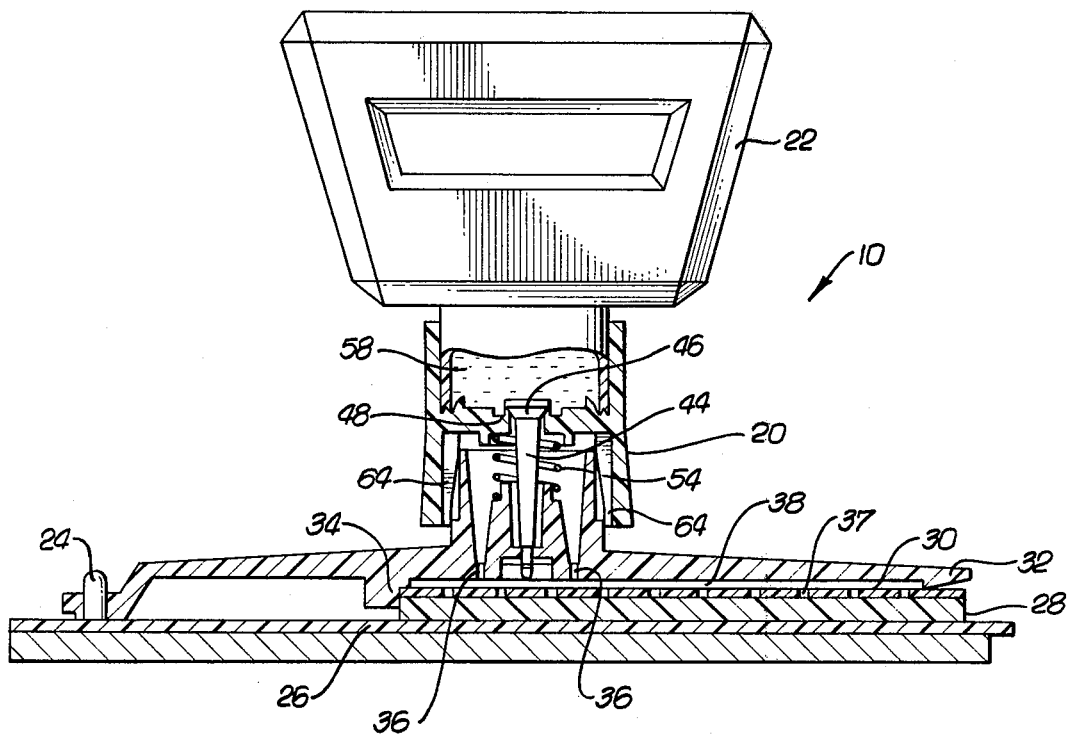
FIG. 3 is a cutaway view of the device of the present invention showing the valve member engaging the valve seat.

Referring first to FIG. 1, the novel record cleaning/conditioning device of the present invention is clearly shown. The device 10 comprises an elongated arm member 12 having a first end 14 and a second end 16. The arm member 12 further includes a first upper surface 13 and a second lower surface 15. A notch or groove 18 is disposed in the arm member 12 adjacent the second end 16 and is adapted to selectively engage a spindle 24 such as is typically used to mount a record on well known record players. A cylindrically shaped housing 20 is rotatably coupled to the arm member 12 and thus permits the arm member 12 to be rotated about record 26 such that a cleaning surface 28 can clean, condition and statically protect the record 26 as hereinafter more fully discussed. Joined to the housing 20 is a fluid reservoir 22. Reservoir 22 supplies the cleaning surface 28 with a volatile cleaning/conditioning fluid.

Referring now to FIG. 2, the device 10 is shown disposed in a generally rectangular container 100. Container 100 comprises a top cover 102 and a base 104. The base 104 has a generally rectangular section 106 which is slightly inclined and adapted to receive the arm member 12. Disposed in the bottom of section 106 is a sponge 108 which retains fluid should an excess of such fluid be dispensed from the device 10 by an inexperienced operator or the like. The base 104 also includes a pedestal 110 configured to engage yet another section of the device 10. Base 104 is designed to be a holder for device 10 while the device 10 is being used to disperse the cleaning/conditioning fluid. Sections 112 of the base 104 joins the pedestal 110 and section 106 to the rim 114. Rim 114 circumferentially surrounds the periphery of the base 104 and is configured such that the top cover 102 is matingly engaged thereon. In this manner, top cover 102 and base 104 are joined together.

While the container 100 has some applicability for use in transporting the device 10, it is preferably made of a decorative plastic material. Thus, container 100 forms a decorative piece which can be used to store the device 10, for example, on the table upon which the record player is situated. When one desires to use the device 10, the top 102 need merely be removed from the base 104 and the device 10 extracted. When storing the device 10, the arm member 12 is positioned in the section 106 and the top cover 102 joined to the base 104. It is to be understood that other means for holding device 10 in position and for joining base 104 and top cover 102 are within the scope of this invention. For example, snap member, tape, etc. could be used to join top cover 102 to base 104; mating rings, pins, etc. could be used to secure device 10 in container 100.

Referring now to FIGS. 3, 4 and 6, one can see in greater detail the various aspects of device 10. Preferably, reservoir 22 has threads on neck 25 which mate with an interior wall of housing 20. Of course, it is understood that other means for joining the reservoir 22 to the housing 20 are within the scope of the present invention. Extending beneath housing 20 is arm member 12. Arm member 12 has a cleaning surface 28 disposed on lower surface 15. Cleaning surface 28, which may be formed of a sponge-like material with or without bristle members extending outwardly therefrom, is preferably joined to a carrier 30. Carrier 30 is slideably engaged by arm member 12 and is held in position between grip members 32 and 34. In the preferred embodiment, carrier 30 is located beneath openings 36 formed in arm member 12. Openings 36 permit cleaning fluid from the reserovir 22 to flow from the reservoir 22 to the cleaning surface 28 as hereinafter described. To aid in the ability of the cleaning fluid to flow and completely wet the entire length of the cleaning surface 28, carrier 30 is formed with a series of holes 37 disposed beneath flow guide channel or elongated trough 38. Thus, as the cleaning fluid would flow through the openings 36, it would flow along channel 38, through openings 37 in carrier 30 and to the cleaning surface 28. To further aid in the ability of the cleaning surface 28 to receive the cleaning fluid along its entire length, arm member 12 and thus associated cleaning surface 28 is inclined at an angle of approximately 1-5 degrees when seated in container 100. This angle is perhaps best seen in FIG. 2.

This housing 20 is comprised of a generally cylindrical member circumferentially disposed about an upwardly extending tubular section 42 formed on the arm member 12. Integrally formed in housing 20 is a flexible valve seat 48 which selectively engages valve stem 44, and more specifically, valve stem head 46. An opening is formed on ledge 60 which permits the valve stem 44 to pass therethrough. Valve stem 44 is disposed in a generally cylindrical pedestal member 66 formed in the arm member 12. The valve stem 44 is held in position by a retaining lug 56 disposed adjacent the bottom of pedestal 66.

Examining the housing 20 in greater detail, one can see that the valve stem 44 is spring actuated by spring member 54. Spring member 54 biases the valve head 46 against the valve seat 48 in the normal or rest position of the device 10. Spring 54 is disposed within a ring 62 formed on ledge 60 and a second ledge 66a formed on the pedestal 66. Also arranged in the housing 20 on ledge 60 are two upwardly extending members; the first of which forms a bottle seal piercer 52, and the second of which forms a seat 55 for the neck 25 of the fluid reservoir 22.

Referring now to FIG. 4, one can see that the reservoir 22 has been screwed into the housing 20 such that the piercers 52 pierced a seal (not shown) disposed across the neck thus permitting fluid 58 to flow out of the reservoir 22. When the reservoir 22 is depressed toward the arm member 12, the valve head 46 disengages the valve seat 48 thereby permitting the fluid 58 to flow through openings 36 into flow channel 38. The downward travel of housing 20 is regulated by means of the upwardly extending section 42 disposed on the arm 12. It is to be understood that other means for controlling the travel of housing 20 are within the scope of the present invention. As the fluid 58 flows through openings 36, it is directed along flow channel 38 through openings 37 in carrier 30 to the cleaning surface 28. This action is encouraged if valve 41 is activated while the device 10 remains in the container 100. As discussed above, in container 100, arm 12 is inclined down toward the periphery of container 100. Thus, fluid 58 more readily flows along channel 38 to the cleaning surface 28.

After the housing 20 has been depressed and sufficient fluid 58 has flowed to the cleaning surface 28, the reservoir 22 is then released. Action of spring 54 against the ledge 60 causes the housing 20, as well as the reservoir 22, to move upward and away from arm member 12. This in turn causes the valve head 46 to re-engage the valve seat 48 thus preventing any further flow of fluid 58 through housing 20.

As shown in FIGS. 1 and 3, one can see that the device 10 has been placed upon record 26. Leakage or the application of additional fluid 58 is prevented as the spring 54 urges the valve head 46 against the valve seat 40 thereby preventing the fluid 58 from flowing through openings 36 into the flow channel 38. While a number of different valve seats could be used to make a selective liquid seal with valve head 46, one configuration which is especially effective in this regard is to make seal 48 out of a flexible material and in the form of an upwardly extending rim. This configuration has been found to be especially desirable and compensates for out-of round parts and variances in tolerance. Further, seal 48 enables housing 20 to be rotated about valve stem 44 without undesirable leakage of fluid 58.

While a wide variety of different and unique features comprise the device 10 of the present invention, some of these features will be discussed in greater detail hereinbelow to further point out the operation thereof. For example, device 10 and housing 100 are configured such that arm 12 is inclined generally towards the outer periphery of the container 100. This incline has been found to be especially important in that because a highly volatile liquid is used as cleaning fluid 58, it is necessary to deliver the cleaning fluid 58 to the cleaning surface 28 as quickly as possible. Because the arm 12 is tilted when disposed in container 100, cleaning fluid 58 more readily flows along the entire length of the channel 38 through holes 37 to the cleaning surface 28. However, when the device 10 is placed on a record, arm 12 is parallel to the surface of the record thus insuring good contact with surface 28. In addition, surface 28 is also preferably made from sponge-like material, foam or the like. As the surface 28 is moved about record 26, it is deformed and readily engages the entire surface of the record and especially the grooves. Since the cleaning means, comprised of cleaning surface 28 coupled to carrier 30, is slideably engaged in arm member 12, it is easily removable and therefore replaceable by other cleaning means of the same or slightly different configuration.

The housing 20 is also of a specific configuration and has a plurality of rib members 64 which circumferentially surround and slideably engage the upwardly extending tubular section 42 on the arm member 12. While ribs 64 are in sliding contact with section 42, they do not bind or otherwise inhibit the sliding action between these two members. Thus, housing 20 can be easily rotated about arm 12 while maintaining contact with ribs 64.

The valve stem 44 and valve seat 48 are also specifically designed such that a fluid-tight seal is formed there between even during rotation. One problem which could arise because the axis of housing and reservoir may not be vertical is that when the device is rotated, the valve could disengage the seat and permit extra fluid to reach surface 28. In the present invention, ring shaped valve seat 48 permits a "floating" action and self-centering to take place with the valve stem 44. This action maintains a seal without adversely affecting the ability of housing 22 (and valve seal 48) to rotate about valve stem 44. This floating action is further achieved by mounting valve stem 44 in pedestal 66 by means of lug 56 and by providing a slight clearance between the interior walls of pedestal 66 and valve stem 44.

The operation of the device 10 will now be presented. Before the device 10 is removed from the container 100, the reservoir 22 is pushed toward arm 12 thereby causing valve head 46 to disengage valve seat 48. Cleaning fluid 58 is now permitted to flow along the path indicated by arrows 50 through arm member 12. The angled configuration of arm 12 while in container 100, encourages the flow of fluid 58 to cleaning surface 28. When disposed on the record, however, arm 12 is parallel to the surface thereof and housing 12 is perpendicular. When sufficient cleaning fluid 58 has flowed to the cleaning surface 26, the reservoir 22 is released. The action of spring 54 causes the housing 20 and the reservoir 22 to return to their original positions.

The device 10 is then placed on the record 26 with notch 18 engaging spindle 24 as shown in FIG. 1. Because ribs 64 act as a bearing on tubular section 42, the housing 20 and the reservoir 22 are permitted to rotate about the arm member 12 as the arm member member 12, in turn, is rotated about record 26. As rotation continues, the surface 28 picks up dirt, dust and the like. Conditioning of the record 26 also takes place as the fluid 58 is applied. To improve the cleaning action, cleaning surface 28 may include bristles which extend into the grooves of the record. Once the device 10 has been rotated a few times about the record 26, it has been found that sufficient cleaning action has been achieved. Because fluid 58 is preferably highly volatile, record 26 can be played immediately after cleaning. In the preferred embodiment, cleaning/conditioning fluid 58 comprises a mixture of isopropyl alcohol and freon, and more specifically, 80-95 wt. % freon, 5-20 wt. % alcohol, a small amount (0.051-0.254 wt. %) of an anti-static agent and a small amount (0.019-0.047 wt. %) of a lubricant. The lubricant which is preferably used accomplishes several things. First, the heat produced by the frictional drag of the stylus is significantly reduced. This is very beneficial as heat is a major contribution to PVC breakdown. Second, the walls of the record grooves are coated such that the stylus glides over the undulations and thus does not break off or wear down the groove edge as fast. Third, the stylus lasts longer—less heat, more glide.

Cleaning/conditioning of record 26 is now completed and device 10 can be replaced in container 100 for future use.

Figure 5:
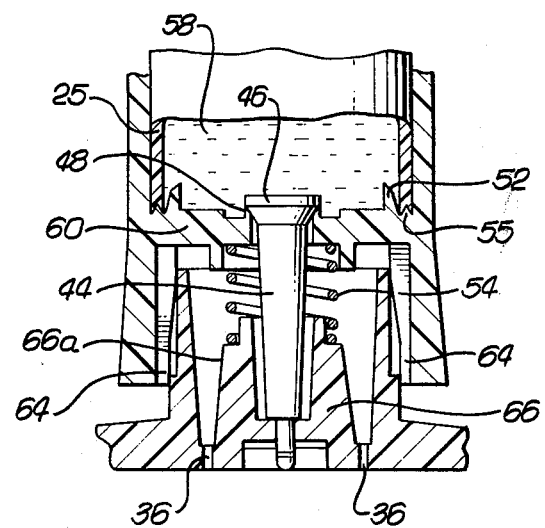
FIG. 5 is a cutaway view of the device of the present invention showing a second embodiment thereof.

Referring now to FIG. 5, one can see a second embodiment of the device 10 of the present invention. In this embodiment housing 20a is joined to arm member 12 by pin members 120 so as to prevent axial rotation there between. More specifically, elongated openings 122 are formed in housing 20a and pin members 120 extend from section 42a into such openings 122. Axial rotation of housing 20a is substantially prevented as such movement causes pin members 120 to engage the sides of openings 122.

In the second embodiment, a plate member 128 having a nozzle 130 is disposed in housing 20a so as to form a chamber 124. Plate member 128 has first and second piercers 52 and 55, respectively, which have been discussed above. Plate member 128 also has an air tube 126 which enables fluid to readily flow out of nozzle 130 without causing the reservoir 22a to collapse.

Located beneath nozzle 130 is a ball valve having a ball 46a and a circular valve seat 48a formed on ledge member 60a. Ball 46a rests on valve seat 48a in the normal position. A spring member 54a is compressed between ball 46a and the bottom of plate member 128, and is disposed about nozzle 130 in the preferred embodiment.

When one desires to use the second embodiment of the present invention, the reservoir 22a would be depressed so as to overcome the force of spring 54a and momentarily held in the down position. Housing 20a would move toward arm 12 causing pedestal 132 to disengage ball 46a from valve seat 48a and engage valve seat 130a on nozzle 130. Fluid in chamber 124 would then be permitted to flow along openings 36 to the arm 12. Leakage is prevented by sloping the top of section 42a toward pedestal 132. Ledge 60a is also configured to prevent fluid from escaping from housing 20a to an area other than openings 36. Note that when housing 20a is depressed, the downward motion is limited by ball 46a as it engages valve seat 130a disposed on nozzle 130 thus preventing additional fluid from flowing into chamber 124. In this manner, a predetermined amount of fluid, i.e., the fluid contained within and determined by the volume of chamber 124, is permitted to flow to the arm 12.

When reservoir 22a is released, spring 54a pushes the reservoir 22a to its initial position. Air in chamber 124 is forced up tube 126 as chamber 124 is filled with fluid from reservoir 22a and thus a constant pressure in reservoir 22a is maintained.

In the second embodiment, the device 10 is rotated about a record 26 and the hand or fingers act as the bearing member against the bottle 22a. For example, as the device 10 is rotated about spindle 24, the bottle 22a would be allowed to slide between the user's fingers thus permitting the device 10 to rotate about the record 26 to be cleaned.

Although this invention has been disclosed and described with reference to particular embodients, the principles involved are susceptible of other applications which would be apparent to persons skilled in the art. For example, in the preferred embodiments, the arm member 12, the rotatable housing 20, the valve stem 44 are all made of plastic. The cleaning surface 28 is preferably made of a generally flexible polyurethane material covered with a velvet-like material which can be easily replaced in arm 12. Of course, other materials are also within the scope of the present invention. Further, while the present invention contemplates the use of a spring loaded valve, other similar valving systems are also within the scope of the present invention such that actuation of the valves can be by means other than by depressing reservoir 22. For example, twisting action, lifting action, and the like are also within the scope of the present invention. This invention, therefore, is not intended to be limited to the particular embodiments herein disclosed.

We claim:

1. A record cleaning/conditioning device and associated container comprising:
   a container for holding said device in a predetermined position;
   an elongated arm member having cleaning means disposed on one side thereof for engaging and cleaning the surface of a record so as to remove dirt and other undesirable contaminants therefrom, said arm member configured such that when said device is disposed in said container, said arm member is inclined downwardly toward the outer periphery of said container;
   a housing coupled to said arm member such that said device can be selectively rotated about a record to be cleaned;
   a fluid reservoir coupled to said housing for supplying said cleaning means with a cleaning/conditioning fluid; and
   means disposed in said housing for regulating the flow of said fluid to said cleaning means.

2. A record cleaning/conditioning device according to claim 1 wherein said arm member has an opening for selectively engaging a spindle.

3. A record cleaning/conditioning device according to claim 1 wherein said cleaning means comprises an outwardly extending sponge-like member mounted in an associated carrier.

4. A record cleaning/conditioning device according to claim 1 wherein said cleaning means is removably joined to said arm member.

5. A record cleaning/conditioning device according to claim 1 wherein said arm member has a trough formed therein permitting said fluid to flow therethrough and wet the entire length of said cleaning means.

6. A record cleaning/conditioning device according to claim 1 wherein said housing is rotatably coupled to said arm member and has (i) piercing means for piercing a seal on said reservoir; and (ii) means for forming a seat for said reservoir.

7. A record cleaning/conditioning device according to claim 1 wherein said regulating means is rotatably disposed in said housing and permits said cleaning fluid to flow therethrough when said housing is depressed.

8. A record cleaning/conditioning device according to claim 1 wherein said container has a trough into which said arm member extends.

9. A record cleaning/conditioning device according to claim 8 wherein means for absorbing fluid is disposed in said trough.

10. A record cleaning/conditioning device according to claim 1 wherein said regulating means comprises a ball valve and associated spring.

11. A record cleaning/conditioning device according to claim 1 wherein said device includes a plate member disposed in said housing, said plate member having piercing means formed thereon.

12. A record cleaning/conditioning device according to claim 11 wherein said device includes a conduit extending from said plate member into said fluid reservoir.

13. A record cleaning/conditioning device according to claim 1 including pin means for joining said housing to said arm member.

14. A record cleaning/conditioning device comprising:
an elongated arm member having cleaning means disposed on one side thereof for engaging and cleaning the surface of a record so as to remove dirt and other undesirable contaminants therefrom;
a housing coupled to said arm member such that said device can be selectively rotated about a record to be cleaned, said housing having (i) piercing means for piercing a seal on a fluid reservoir; and (ii) an outwardly extending ring member defining a seat for a fluid reservoir;
a fluid reservoir coupled to said housing and engaging said seat, said fluid reservoir for supplying said cleaning means with a cleaning/conditioning fluid; and
valve means disposed in said housing for regulating the flow of cleaning/conditioning fluid to said cleaning means, said valve means including a valve head biased toward an outwardly extending ring-shaped valve seat formed in said housing.

* * * * *